US008347274B2

(12) United States Patent
Tanabe et al.

(10) Patent No.: US 8,347,274 B2
(45) Date of Patent: Jan. 1, 2013

(54) DEBUGGING SUPPORT DEVICE, DEBUGGING SUPPORT METHOD, AND PROGRAM THEREOF

(75) Inventors: Ken Tanabe, Tokyo (JP); Takahiro Tokuyoshi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 779 days.

(21) Appl. No.: 12/558,716

(22) Filed: Sep. 14, 2009

(65) Prior Publication Data
US 2010/0175051 A1    Jul. 8, 2010

(30) Foreign Application Priority Data

Jan. 8, 2009 (JP) ................................. 2009-002911

(51) Int. Cl.
*G06F 9/44* (2006.01)
(52) U.S. Cl. ...................................................... 717/135
(58) Field of Classification Search .......... 717/124–127, 717/134, 135
See application file for complete search history.

(56) References Cited

U.S. PATENT DOCUMENTS

| 6,560,720 B1* | 5/2003 | Chirashnya et al. ............ 714/32 |
| 2006/0259698 A1* | 11/2006 | Sohm et al. .................... 711/122 |
| 2007/0276832 A1* | 11/2007 | Teranishi et al. ................ 707/7 |
| 2008/0177527 A1* | 7/2008 | Yoshinaga ...................... 703/26 |
| 2009/0138862 A1 | 5/2009 | Tanabe et al. |

FOREIGN PATENT DOCUMENTS

| GB | 2 454 968 A | 5/2009 |
| JP | 5-165675 | 7/1993 |
| JP | 9-22369 | 1/1997 |
| JP | 2002-132743 | 5/2002 |
| JP | 2005-128692 | 5/2005 |
| JP | 2006-146412 | 6/2006 |
| JP | 2008-517370 | 5/2008 |
| WO | WO 2006/043227 A1 | 4/2006 |

OTHER PUBLICATIONS

Office Action issued Jun. 12, 2012 in Japanese Application No. 2009-002911 (With English Translation).
Mieko SUGIMOTO, "Visualization", Debug, Built-in Press, vol. 11, Jun. 1, 2008, pp. 49-53 (With Partial English Translation).

* cited by examiner

*Primary Examiner* — Anna Deng
(74) *Attorney, Agent, or Firm* — Oblon, Spivak, McClelland, Maier & Neustadt, L.L.P.

(57) ABSTRACT

A debugging support device includes: a plurality of CPU simulating units which simulates the operations of a plurality of CPUs which executes programs in parallel; a memory simulating unit of a memory to be shared by the plurality of CPUs; an event monitoring unit that detects a predetermined event occurring between each CPU simulating unit and the memory simulating unit; and a state judging unit that judges whether the state of the occurred predetermined event matches a predetermined condition and, if the predetermined condition is matched, records history information related to the state of the memory simulating unit.

16 Claims, 17 Drawing Sheets

FIG.7

| PROCESSING UNIT | TIME | PC | CONTENT | ARGUMENT 1 | ARGUMENT 2 | RETURN VALUE |
|---|---|---|---|---|---|---|
| Core 0 | 100000 | 0x2000 | Start Thread | | | |
| Core 0 | 100012 | 0x2030 | Allocate shared Memory | 0x10 | | 0x4000 |
| Core 0 | 100050 | 0x2040 | Make Thread | 0x3000 | 0x4000 | |
| Core 0 | 100060 | 0x2050 | Make Thread | 0x3500 | 0x4000 | |
| Core 2 | 100100 | 0x3500 | Start Thread | | | |
| Core 2 | 100620 | 0x3550 | Open exclusive Memory | 0x4000 | 0x10 | 0x5000 |
| Core 2 | 100650 | 0x3570 | Write Memory | 0x5002 | | |
| Core 2 | 100660 | 0x3590 | Write Back Memory | 0x5000 | 0x10 | |
| Core 0 | 100665 | 0x2060 | End Thread | | | |
| Core 2 | 100670 | 0x35A0 | Close exclusive Memory | 0x5000 | 0x10 | 0x4000 |
| Core 2 | 100680 | 0x35B0 | End Thread | | | |
| Core 1 | 104000 | 0x3000 | Start Thread | | | |
| Core 1 | 104016 | 0x3050 | Open exclusive Memory | 0x4000 | 0x10 | 0x5000 |
| Core 1 | 104020 | 0x3070 | Write Memory | 0x5002 | | |
| Core 1 | 104030 | 0x3090 | Write Back Memory | 0x5000 | 0x10 | |
| Core 1 | 104050 | 0x30A0 | Close exclusive Memory | 0x5000 | 0x10 | 0x4000 |
| Core 1 | 105000 | 0x30B0 | End Thread | | | |
| | | | | | | |
| Core 0 | 106000 | 0x2500 | Free Exclusive Memory | 0x4000 | 0x10 | |
| | | | | | | |
| Core 0 | 110100 | 0x2000 | Start Thread | 0x80A0 | | |
| Core 0 | 110120 | 0x2030 | Allocate shared Memory | 0x10 | | 0x4000 |
| Core 0 | 110250 | 0x2040 | Make Thread | 0x3000 | 0x4000 | |
| Core 0 | 110260 | 0x2050 | Make Thread | 0x3500 | 0x4000 | |
| Core 1 | 113000 | 0x3000 | Start Thread | | | |
| Core 0 | 113010 | 0x2060 | End Thread | | | |
| Core 1 | 113016 | 0x3050 | Open exclusive Memory | 0x4000 | 0x10 | 0x5000 |
| Core 1 | 113020 | 0x3070 | Write Memory | 0x5002 | | |
| Core 1 | 113030 | 0x3090 | Write Back Memory | 0x5000 | 0x10 | |
| Core 2 | 114100 | 0x3500 | Start Thread | | | |
| Core 2 | 114620 | 0x3550 | Open exclusive Memory | 0x4000 | 0x10 | 0x5000 |
| Core 2 | 114650 | 0x3570 | Write Memory | 0x5002 | | |
| Core 2 | 114660 | 0x3590 | Write Back Memory | 0x5000 | 0x10 | |

| HEAD OF REGION | END OF REGION | TIME OF ALLOCATION | ALLOCATION PC | ALLOCATION PROCESSING UNIT | TIME OF FINAL STATE TRANSITION PROCESSING | FINAL STATE TRANSITION PROCESSING PC | FINAL STATE TRANSITION PROCESSING UNIT | STATE |
|---|---|---|---|---|---|---|---|---|
| 0x4000 | 0x4010 | 110610 | 0x2030 | CORE 1 | 110670 | 0x20A0 | CORE 1 | Shared |
| 0x4010 | 0x40A0 | | | | | | | |
| ... | ... | ... | ... | ... | ... | ... | ... | ... |

FIG.9

|  | Invalid | Exclusive | Shared |
|---|---|---|---|
| read | NG | OK | OK |
| write | NG | OK | OK |
| allocate_exclusive | OK | – | – |
| allocate_shared | OK | – | – |
| free_exclusive | NG | OK | NG |
| free_shared | NG | NG | OK |
| open_exclusive | NG | NG | OK |
| open_shared | NG | OK | NG |
| close_exclusive | NG | OK | NG |
| close_shared | NG | NG | OK |
| ⋮ | ⋮ | ⋮ | ⋮ |

| HEAD OF REGION | END OF REGION | TIME OF ALLOCATION | ALLOCATION PC | ALLOCATION PROCESSING UNIT | TIME OF FINAL STATE TRANSITION PROCESSING | FINAL STATE TRANSITION PROCESSING PC | FINAL STATE TRANSITION PROCESSING UNIT | STATE | TIME OF VIOLATION TRANSITION PROCESSING | VIOLATION TRANSITION PROCESSING PC | VIOLATION TRANSITION PROCESSING UNIT |
|---|---|---|---|---|---|---|---|---|---|---|---|
| 0x4000 | 0x4010 | 110610 | 0x2030 | CORE 1 | 110670 | 0x20A0 | CORE 1 | Shared | 130580 | 0x30B0 | CORE 2 |
| 0x4010 | 0x40A0 | ... | ... | ... | ... | ... | ... | ... | | | |

FIG.11

```
1  int* ptr;
2  void sw_on_core1(){
3      ptr = allocate_shared(size);
4      data1 = ptr[4];/* Correct. Read enabled. */
5      ptr[8] = 10;    /* Incorrect. Write disabled. */
6  }
7  void sw_on_core2(){
8      data2=prt[3];/* Correct. Read enabled. */
9  }
```
21

FIG.12

```
1  int* ptr;
2  void sw_on_core1(){
3      ptr = allocate_exclusive(size);
4      data1 = ptr[4];/* Correct. Read enabled. */
5      ptr[8] = 10;    /* Correct. Write enabled. */
6  }
7  void sw_on_core2(){
8      data2=prt[3];/* Incorrect. Since not owner, read/write disabled. */
9  }
```
22

FIG.13

| VIOLATION TYPE | NUMBER OF VIOLATIONS | VIOLATION TRANSITION PROCESSING SOURCE LINE | STATE | ALLOCATED SOURCE LINE | FINAL STATE TRANSITION PROCESSING SOURCE LINE |
|---|---|---|---|---|---|
| 1005 | 105 | test2.c:10 | shared | test1.c:20 | test2.c:50 |
| 1105 | 20 | test0.c:10 | shared | test1.c:20 | test2.c:40 |
| 1004 | 1 | test3.c:20 | exclusive | test4.c:100 | test6.c:90 |
| ... | ... | ... | ... | ... | ... |

| TIME OF VIOLATION TRANSITION PROCESSING | HEAD OF REGION | END OF VIOLATION | STATE | TIME OF ALLOCATION | TIME OF FINAL STATE TRANSITION PROCESSING |
|---|---|---|---|---|---|
| 1050320 | 0x4000 | 0x4010 | Shared | 205402 | 305045 |
| 1070320 | 0x4000 | 0x4010 | Shared | 205402 | 305045 |
| 1090320 | 0x4900 | 0x4910 | Shared | 1080502 | 1095000 |
| ... | ... | ... | ... | ... | ... |

```
1    void lock(int* adr){
2        while( tas(adr) == 1) { /* busy loop */ }
23   3    }
4    void unlock(int* adr){
5        *adr = 0;
6    }
```

FIG.20

| tas ADDRESS | ACQUIRED CORE | TIME OF FIRST tas | TIME OF ACQUISITION | TIME OF RELEASE | NUMBER OF FAILURES |
|---|---|---|---|---|---|
| c | 1 | t1 | t1 | t3 | 0 |
| c | 2 | t2 | t4 | -- | 3 |

206

DEBUGGING SUPPORT DEVICE, DEBUGGING SUPPORT METHOD, AND PROGRAM THEREOF

CROSS-REFERENCE TO RELATED APPLICATION

This application is based upon and claims the benefit of priority from the prior Japanese Patent Application No. 2009-2911 filed in Japan on Jan. 8, 2009; the entire contents of which are incorporated herein by reference.

BACKGROUND OF THE INVENTION

1. Field of the Invention

The present invention relates to a debugging support device, debugging support method, and program thereof. In particular, the present invention relates to a debugging support device, debugging support method, and program thereof for programs to be executed in parallel.

2. Description of Related Art

Conventionally, multi-core processor systems having a plurality of cores have been widely used. There are cases where a multi-core processor system takes the form of a parallel computer in which each of the cores included in the system has a cache memory. In a multi-core processor system, the consistency in values is maintained by hardware (hereinafter abbreviated as HW) or software (hereinafter abbreviated as SW).

In particular, in the case of a system where consistency is maintained by SW, a memory space is divided into pages, whereby each core executes respective processing while managing pages related to such processing in a shared state or an exclusive state.

For example, let us assume a case of a parallel computer in which two cores, namely, 1 and 2 respectively include a computing unit and a cache memory, and process data contained in a single main memory connected to the cores 1 and 2 via a bus. The memory space is divided into pages, whereby pages related to processing are set to either a shared state or an exclusive state when a program is executed by each core.

For example, assume that, at a given moment, a given page "a" is set to a shared state so as to enable data thereof to be shared among cores, and a given page "b" is set to an exclusive state so as to enable a particular core to write data thereinto. Since the page "a" set to the shared state is to be shared among cores, the page "a" is set so as to be readable from any core but, at the same time, unwriteable by any core.

Because the page "a" is in a shared state, the same value such as y is read by both the core 1 and the core 2 when reading a value from a given line in page "a". In the shared state, the core 1 and the core 2 are prohibited from writing a value to the page "a". This is because if core 1 writes a given value such as z to the line, the core 2 is unable to see the updated value and ends up reading the old value y, thereby preventing consistency from being maintained.

The page "b" in an exclusive state is to be exclusively used by a specific core that has become the so-called owner of the page "b". Therefore, only the specific core is able to read from and write to the page "b".

Since the page "b" is set to an exclusive state by the core 1, the core 1 is able to read from and write to each line in the page "b". In addition, no problem will arise even if the value y on the main memory and the value z in the cache memory of the core 1 are inconsistent. This is because only the core 1 can read data on the page "b". Furthermore, the inconsistent state problem can be solved by having the core 1 write back to the memory when releasing the page "b". When the page "b" is in an exclusive state, the core 2 is prohibited from both reading and writing data from/to the page "b". This is because when attempting to read data, there is a risk that an old value will be inadvertently read. Moreover, when data is mistakenly written, there is a risk that the core 1 will overwrite the written value with another value.

Access to each page is restricted in accordance with such states, and the states dynamically change during program execution.

Various techniques for debugging software, including inconsistencies thereof, to be executed by such a multi-core processor system are being proposed. Normally, when debugging software, a code for monitoring is added to a debugging target program in order to monitor operations inside the cores. Such added codes enable observation of operational states inside the core in accordance with the target program.

Japanese Patent Application Laid-Open Publication No. 2006-146412 proposes a multi-core processor with a built-in debugging control unit, in which the debugging control unit is controlled by a single CPU. In addition, Japanese Patent Application Laid-Open Publication No. 05-165675 proposes a debugging support device capable of monitoring program access by a plurality of processors to respective memory regions.

However, when a monitoring code is added to a debugging target program, the increase in executable codes caused by the addition creates a problem that the difference in respective execution timings and the like between a case where a program to which the monitoring code has not been added is executed and a case where a program to which the monitoring code has been added is executed prevents debugging from being performed accurately. For example, there may be a case where the execution of the program to which the monitoring code has not been added results in a bug but the execution of the program to which the monitoring code has been added does not.

In particular, in the case of a multi-core processor system, debugging requires that focus be placed on a plurality of cores, the behavior of each core be monitored, and an analysis for bug detection must be performed.

However, while the techniques according to the proposals described above are capable of monitoring data associated with behavior, information regarding bugs cannot be accurately detected. In addition, the proposals do not particularly involve a method of presenting bug-related information to a program developer and the like in an easily-understood manner.

On the other hand, in a system that does not include HW for managing shared resources such as a memory, it is required that the occupancy state of resources be managed by having a program developer embed a call code for occupancy state transition processing of resources in SW into the target program. For example, Japanese Patent Application Laid-Open Publication No. 2008-517370 and U.S. Patent Publication 2006-0259698 A1 propose targeting cache coherence violation detection of a shared memory as a method for detecting a rule violation of resource management processing and presenting the same to a program developer. However, with the proposals, it is difficult to identify the cause of a violation when occupancy state transition processing is called by a plurality of processing units operating in parallel.

Furthermore, for example, while Japanese Patent Application Laid-Open Publication No. 2008-4054 proposes a technique for graphically representing task transition states and resource use states in a time sequence and utilizing the same to improve performance as a method of displaying shared resource use states of a plurality of processing units that operate in parallel, the graphically represented states cannot be utilized for detecting rule violations.

Moreover, besides the consistency problem described above, a multi-core processor system has problems in exclusive control of performance regarding lock or unlock instructions, occurrences of deadlocks, and the like.

Consequently, including the aforementioned problems, no proposals have been made in regard to a method of accurately detecting bug-related information and notifying a program developer or the like of such bug-related information in an easily-understood manner.

BRIEF SUMMARY OF THE INVENTION

According to an aspect of the present invention, a debugging support device is provided which includes: a plurality of CPU simulating units which simulates the operations of a plurality of CPUs which executes programs in parallel; a shared resource simulating unit which simulates a shared resource to be shared by the plurality of CPUs; an event monitoring unit that detects a predetermined event occurring between each CPU simulating unit and the shared resource simulating unit; and a state judging unit that judges whether the state of the occurred predetermined event matches a predetermined condition, and, if the predetermined condition is matched, records history information related to the state of the shared resource.

In addition, according to an aspect of the present invention, a debugging support method is provided which uses a debugging support device including a plurality of CPU simulating units which simulates the operations of a plurality of CPUs which executes programs in parallel and a shared resource simulating unit which simulates a shared resource to be shared by the plurality of CPUs to: detect a predetermined event occurring between each CPU simulating unit and the shared resource simulating unit; judge whether the state of the occurred predetermined event matches a predetermined condition; and, if the predetermined condition is matched, record history information related to the state of the shared resource.

BRIEF DESCRIPTION OF THE DRAWINGS

FIG. 7 is a diagram showing an example of an execution record table according to the first embodiment of the present invention;

FIG. 8 is a diagram showing an example of a state table according to the first embodiment of the present invention;

FIG. 9 is a diagram showing an example of a protocol rule table according to the first embodiment of the present invention;

FIG. 10 is a diagram showing an example of a judgment result record table according to the first embodiment of the present invention;

FIG. 11 is a diagram partially showing an example of a program that includes a bug according to the first embodiment of the present invention;

FIG. 12 is a diagram partially showing another example of a program that includes a bug according to the first embodiment of the present invention;

FIG. 13 is a diagram showing a display example of a violation line number table according to the first embodiment of the present invention;

FIG. 15 is a diagram showing an example of a violation time list display according to the first embodiment of the present invention;

FIG. 20 is a diagram showing an example of a lock/unlock management table according to the second embodiment of the present invention.

DETAILED DESCRIPTION OF THE INVENTION

Hereinafter, embodiments of the present invention will be described with reference to the drawings.

First Embodiment (Configuration)

Figure 1:
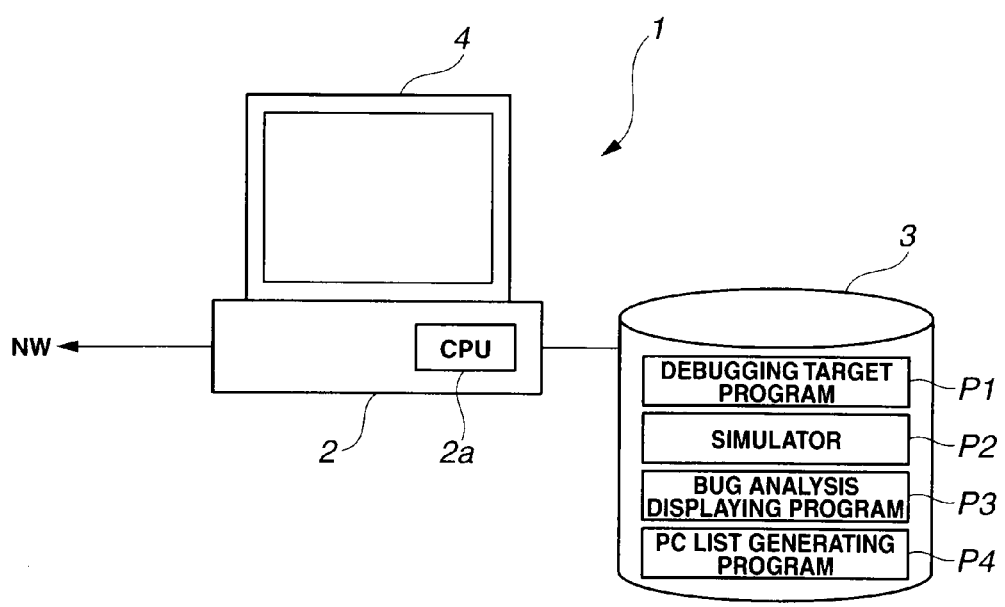
FIG. 1 is a configuration diagram showing a configuration of a program development apparatus according to a first embodiment of the present invention.

First, a configuration of a program development apparatus according to a first embodiment of the present invention will be described with reference to FIG. 1. FIG. 1 is a configuration diagram showing a configuration of a program development apparatus according to the present embodiment.

A program development apparatus 1 is configured so as to include: a main body device 2 having a central processing unit (hereinafter referred to as a CPU) 2a that executes various software programs to be described afterwards; a storage unit 3 connected to the main body device 2 and which stores various software programs and the like; and a display unit 4 connected to the main body device 2. Moreover, although not shown, an input device such as a keyboard, a mouse, or the like to be used for the user in order to issue instructions to execute various programs is connected to the main body device 2.

The storage unit 3 stores, as various software programs: a debugging target program P1; a debugging function-added simulation program (hereinafter referred to as a simulator) P2; a bug analysis display program P3; and a program counter (PC) list generating program P4. The CPU 2a of the main body device 2 is capable of executing or reading out the programs stored in the storage unit 3.

Therefore, when debugging or tuning a program under development, a program developer (hereinafter also referred to as a user) can have the storage unit 3 store the program under development, specify the program under development as a debugging target program P1, and execute the simulator P2 to perform debugging and the like.

In addition, the program developer can use the bug analysis displaying program P3 to display debugging results on a screen of the display unit 4 in an easy-to-understand manner.

The program under development is a program to be executed on a multi-core processor system that is a parallel computer. The multi-core processor system does not include a mechanism to keep consistencies using hardware. Hereinafter, as an example, the program under development will be described as being a program to be executed on two core processors. In addition, the description below will be given under the assumption that the multi-core processor system includes a plurality of core processors (in this case, two core processors) each having a cache memory, and a single main memory, and that the simulator P2 is to execute a simulation for debugging. Furthermore, when a partial region on the main memory that is a shared memory is to be cached on the non-shared cache memory inside each processing unit that is a core processor, cache coherence is guaranteed.

(Configuration of Simulator)

Figure 2:
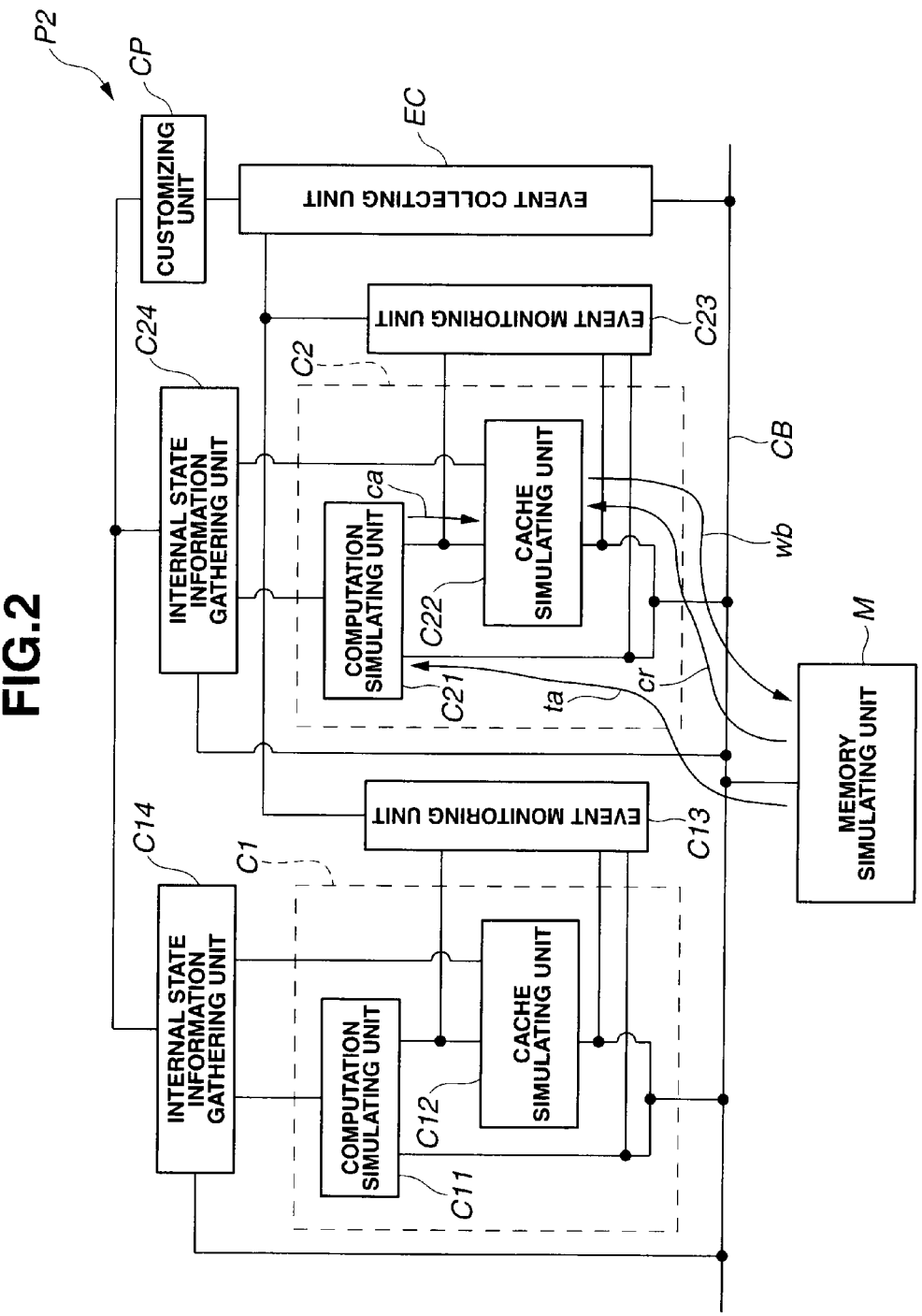
FIG. 2 is a configuration diagram showing a configuration of a simulator according to the first embodiment of the present invention.

Next, a configuration of the simulator P2 will be described. FIG. 2 is a configuration diagram showing a configuration of the simulator P2.

The simulator P2 includes core processor simulating units (hereinafter referred to as core simulating units) C1, C2 that simulate the two core processors (hereinafter also simply referred to as cores), and a memory simulating unit M that simulates the main memory. The core simulating unit C1 includes a computation simulating unit C11 and a cache simulating unit C12, while the core simulating unit C2 includes a computation simulating unit C21 and a cache simulating unit C22.

The simulator P2 further includes: an event monitoring unit C13 for the core simulating unit C1; an event monitoring unit C23 for the core simulating unit C2; an internal state information gathering unit C14 for the core simulating unit C1; an internal state information gathering unit C24 for the core simulating unit C2; an event collecting unit EC; a customizing unit CP; and a bus simulating unit CB.

The core simulating units C1, C2 correspond to the two core processors of the multi-core processor system (hereinafter referred to as a target processor) on which the debugging target program P1 is to be executed.

The computation simulating units C11 and C21 are processing units that respectively simulate the computing unit of a core processor of the target processor, and realize various computing functions of each computing unit.

The cache simulating units C12 and C22 are processing units that respectively simulate the cache memory of a core processor of the target processor.

The memory simulating unit M is a processing unit that simulates the main memory.

The bus simulating unit CB is a processing unit that simulates a bus connecting the respective processors and the main memory of the target processor.

The event monitoring units C13 and C23 are processing units that respectively realize a function for collecting each event that occurs in the core simulating units C1, C2, and convey the event to the event collecting unit EC. In other words, each event monitoring unit is a processing unit that monitors data between simulating units. Specifically, each event monitoring unit monitors data exchange between the corresponding computation simulating unit and the cache simulating unit, the corresponding cache simulating unit and the memory simulating unit, and the corresponding computation simulating unit and the memory simulating unit.

Events include a cache access, a cache refill request, a cache writeback request, and the like. In addition, the event monitoring units C13, C23 also include a function for notifying, as an event, that a pointer of a computing unit has reached a pre-registered program counter (PC) value. For example, by pre-registering the beginning of a function that changes a state of a memory region, an execution of the function can be detected as an occurrence of an event.

For example, as shown in FIG. 2, when there is a cache access "ca" from the computation simulating unit C11 to the cache simulating unit C12, the access is monitored. In addition, the event monitoring unit C13 monitors events such as a cache refill request cr or a cache writeback request wb between the cache simulating unit C12 and the memory simulating unit M. Furthermore, the event monitoring unit C13 monitors a read request to or the like made from the computation simulating unit C11 to the memory simulating unit M by bypassing a cache.

Event monitoring is performed by monitoring the presence/absence of an access or the like to a predetermined address on a memory space during the execution of the simulator P2. For example, when data at a predetermined address is read or written, each event monitoring unit is capable of judging that a predetermined event has occurred and conveying information on the event to the event collecting unit EC.

The event collecting unit EC collects information conveyed from each event monitoring unit as well as information from the bus simulating unit CB, and when a predetermined event occurs, conveys information on the event to the customizing unit CP and calls the customizing unit CP. The called customizing unit CP executes judgment processing to be described later. As will be described afterwards, the customizing unit CP constitutes a state judging unit that references a state table and a protocol rule table to judge whether a state of an occurred event matches a predetermined condition, and if the predetermined condition is matched, records history information regarding a state of the main memory that is a shared resource.

The customizing unit CP is a processing unit that realizes a function which is called by the event collecting unit EC in order to perform predetermined checking such as checking, based on received event information, whether an event matches a predetermined condition or the like. The check content of the customizing unit CP or, in other words, a judgment condition is arranged so as to be customized by the user by setting or changing the judgment condition depending on purpose or the content to be checked. The set condition or the like is to be stored in the storage unit 3 as a protocol rule table to be described later.

Let us assume that, in the example described above, a judgment condition has been preset in which a re-issuing of a command for changing a page to an exclusive state even when the page is already set to an exclusive state constitutes a violative setting. In this case, the customizing unit CP performs a check on whether the condition is satisfied or not when an event occurs which changes the page to an exclusive state. When a command for changing the page to an exclusive state is re-issued, the customizing unit CP judges a violation occurrence. Therefore, the user is able to set a content to be checked by the customizing unit CP as he/she wants.

The internal state information gathering units C14, C24 are processing units that realize a function for reading values of a register, a cache memory, or the like inside a corresponding core processor. In response to a request from the customizing unit CP, the internal state information gathering units C14, C24 respectively gather data from the respective simulating units of the corresponding core and from the memory simulating unit M. In addition to data on the processing target and the like, the gathered data is to also include information such as the number of cycles.

(Operation)

Next, a debugging operation of the program development apparatus 1 will be described.

To debug a program that is already developed or is currently under development, the user or the program developer executes the simulator P2 and the bug analysis displaying program P3. The simulator P2 executes the debugging target program P1 on the simulator P2. Based on an execution result of the simulator P2, the bug analysis displaying program P3 is capable of displaying the occurred bug in a manner that is easily understood in terms of analyzing the bug on the screen of the display unit 4.

(Creating and Registering a Program Counter List)

While the debug processing described above is to be executed by the program development apparatus 1, a program counter list (hereinafter, also referred to as a PC list) is generated as preprocessing. A PC list is data representing a correspondence relationship between events and program counter values.

The program P1 is a source program, and is compiled and converted into an object program. The converted object program is to be executed on the simulator P2.

Therefore, when an object program is generated, data of a PC list is created in advance from the object program and registered in each event monitoring unit C13, C23. Based on the PC list, each event monitoring unit C13, C23 judges whether or not a predetermined event has occurred.

Figure 3:
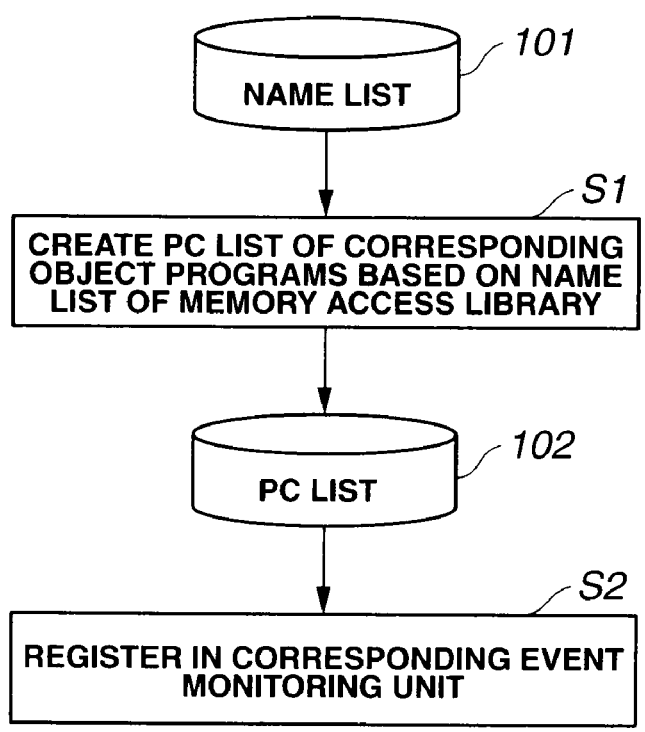
FIG. 3 is a flowchart showing an example of a processing flow of a PC list generating program according to the first embodiment of the present invention.

FIG. 3 is a flowchart showing an example of a processing flow of a PC list generating program for generating and registering in the event monitoring unit a PC list to be generated and registered in advance. As shown in FIG. 1, the PC list generating program P4 is also stored in the storage unit 3 and executed by the CPU 2a of the main body device 2.

In addition, what kind of event is to be monitored is determined in advance by the user. Therefore, a name of an event to be monitored (hereinafter also referred to as a monitoring target event) is registered in advance as memory access information in a predetermined library (hereinafter referred to as a memory access library). The user is able to set and change a monitoring target event by changing the contents of a name list in the memory access library as he/she wants.

As shown in FIG. 3, after data of a name list 101 of the memory access library is set, based the name list 101, the CPU 2a creates a PC list 102 of corresponding object programs (S1).

The CPU 2a registers data of the created PC list 102 into each corresponding event monitoring unit C13, C23 (S2). Data of the PC list 102 is data on a value of a program counter (hereinafter referred to as a PC value) of an object code corresponding to a code to be monitored in the source program P1.

For example, if an "allocate_shared" command is a monitoring target event, a PC value of an object code corresponding to the "allocate_shared" code is registered in the PC list 102 together with the contents of the event or with an instruction.

In other words, registered in each event monitoring unit C13, C23 is a PC value of an object code corresponding to the monitoring target event with respect to the corresponding core.

In addition, the user presets and registers in advance conditions and the like corresponding to the aforementioned event to be checked as a protocol rule table to be described later.

Hereinafter, contents of processing by the respective processing units will be described together with an overall processing flow in regard to debug processing of the program development apparatus 1.

(Protocol Violation Detection Processing)

Figure 4:
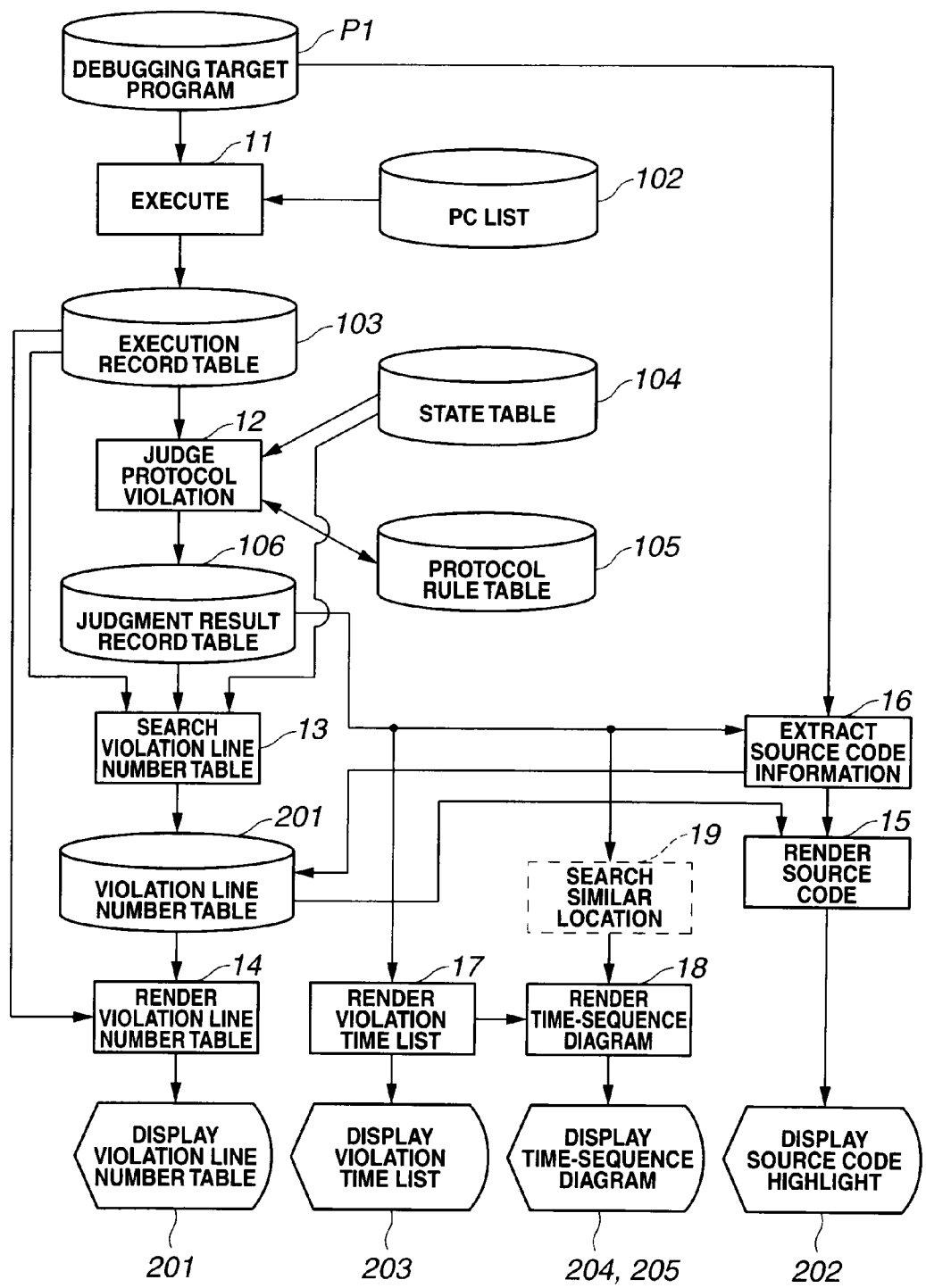
FIG. 4 is a diagram for explaining an overall processing flow in regard to debug processing of a program development apparatus according to the first embodiment of the present invention.

FIG. 4 is a diagram for explaining an overall processing flow in regard to debug processing of the program development apparatus 1.

As shown in FIG. 4, the debugging target program P1 is executed by the simulator P2. In execution processing 11 thereof, the event monitoring units C13, C23 monitor the occurrence of the aforementioned predetermined event using data of the PC list 102, and the event collecting unit EC stores information on the detected predetermined event as execution record data into an execution record table 103 in the storage unit 3. The execution processing 11 is to be executed by the event monitoring units C13, C23, the event collecting unit EC, and the customizing unit CP.

First, contents of processing by the event monitoring units C13, C23 in the execution processing 11 will be described.

(Processing by the Event Monitoring Unit)

Figure 5:
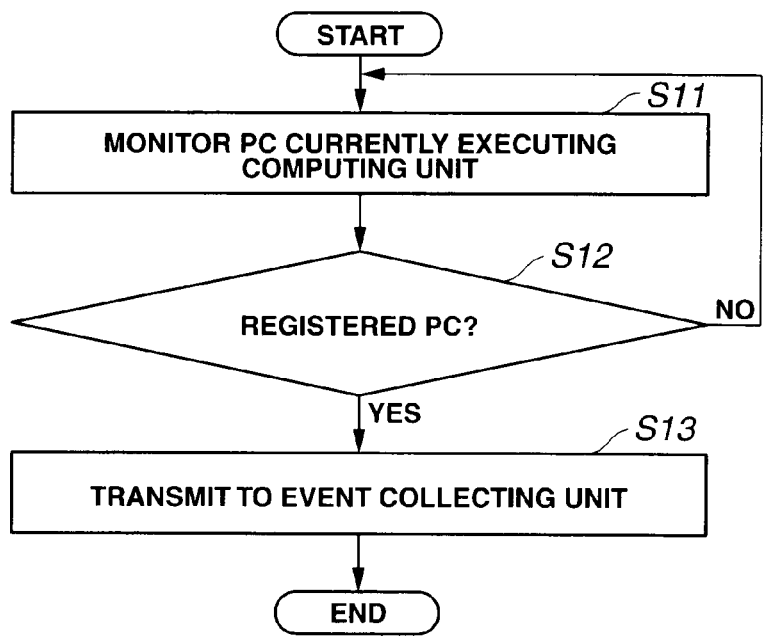
FIG. 5 is a flowchart showing an example of a processing flow for monitoring an execution state of a computation simulating unit of an event monitoring unit according to the first embodiment of the present invention.

FIG. 5 is a flowchart showing an example of a processing flow for monitoring an execution state of a computation simulating unit of the event monitoring unit.

When the debugging target program P1 is executed, the event monitoring units C13, C23 monitor a PC value of a program being executed at the computation simulating units C11, C21 (S11). A judgment is made on whether or not the PC value being monitored is consistent with any of the PC values pre-registered in the PC list 102 (S12).

If inconsistent, S12 results in NO and the processing returns to S11 without performing anything.

Consistent values mean that the event set to be monitored by the user has occurred, and S12 results in YES. The event monitoring unit then conveys information on the occurred event to the event collecting unit EC (S13). Event information includes information on the core processor (i.e. processing unit) in which the event occurred, a PC value, and contents of the event.

As described above, when the CPU of the core processor corresponding to the computation simulating unit performs access or the like set in advance to a cache memory corresponding to the cache simulating unit or the main memory corresponding to the memory simulating unit, the event monitoring unit conveys information on the event to the event collecting unit EC.

Figure 6:
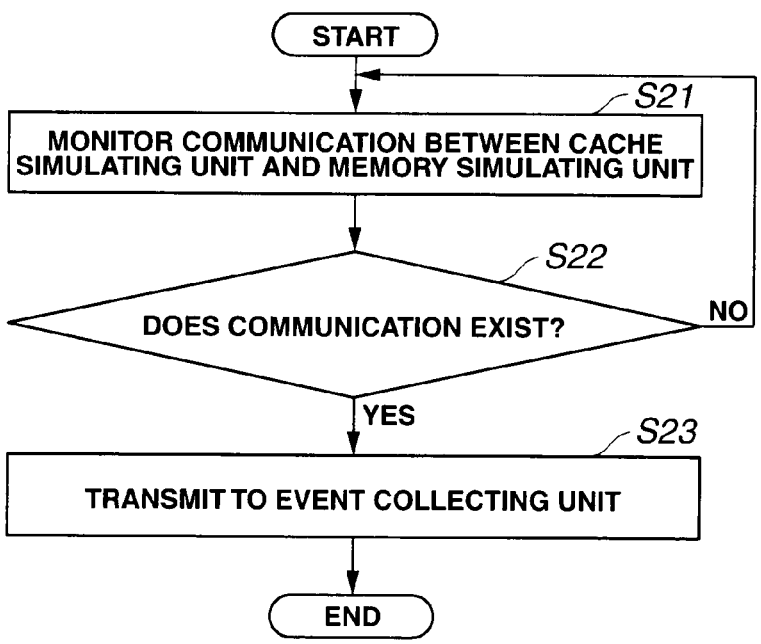
FIG. 6 is a flowchart showing an example of a processing flow for monitoring contents of processing between resources of the event monitoring unit according to the first embodiment of the present invention.

In addition, the event monitoring units C13, C23 also monitor communication occurring between a cache memory corresponding to the cache simulating unit and the main memory corresponding to the memory simulating unit. Specifically, such processing as shown in FIG. 6 is performed. Communication occurs, for example, when there is a cache refill.

FIG. 6 is a flowchart showing an example of a processing flow for monitoring contents of processing between resources of the event monitoring unit.

When the debugging target program is executed, the event monitoring units C13, C23 monitor communication that occurs between the cache simulating unit and the memory simulating unit (S21).

Monitoring is performed so as to determine whether communication exists or not (S22). If there is no communication or, in other words, if communication does not exist, S22 results in NO and processing returns to S21 without performing anything.

If communication exists or, in other words, if communication has occurred, S22 results in YES and the communication event is conveyed to the event collecting unit EC (S23).

As described above, in execution processing 11, when communication exists between the cache memory corresponding to the cache simulating unit and the main memory corresponding to the memory simulating unit, information on the event is conveyed to the event collecting unit EC.

In execution processing 11, upon receiving information on an event from each event monitoring unit, the event collecting unit EC conveys the received event information to the customizing unit CP.

(Processing by Customizing Unit)

Upon receiving event information, the customizing unit CP gathers data determined in advance for each event via the internal state information gathering units C14, C24, and records the event information in the execution record table 103. In other words, upon receiving event information, the customizing unit CP as a state judging unit gathers information determined in advance in correspondence to the event via the internal state information gathering units C14, C24, and records the information together with the received event information in the execution record table 103 as an event profile. For example, when an argument 1 is registered in a predetermined register for a given event, data to be gathered via the internal state information gathering unit is determined in advance in the customizing unit CP so as to gather data from the register.

(Execution Record Table)

FIG. 7 is a diagram showing an example of the execution record table 103. Event information as execution record data to be recorded in the execution record table 103 shown in FIG. 7 includes data on the respective items of: processing unit; time; PC value; content; argument of 1 or greater; and return value. For every occurring event, the customizing unit CP records such event information together with data gathered via the internal state information gathering unit.

For example, line 21 in FIG. 7 indicates that "Start Thread" executed by a core 0 occurred at a program counter value of "0x2000" at time (cycle value) "110100" at the processing unit of a core 1, and that an argument thereof was "0x80A0".

Therefore, the execution record table 103 includes data on the generation, start, and finish of a function, a thread, or the like that is a unit of parallel processing at each CPU simulating unit, as well as the allocation, state transition, read, write, and release of a memory.

Based on the event information shown in FIG. 7, the customizing unit CP creates state data in the state table shown in FIG. 8 to be described next. FIG. 8 is a diagram showing an example of a state table.

(State Table)

A state table 104 shown in FIG. 8 includes the respective items regarding a memory region of: head of region; end of region; time of allocation (number of cycles); allocation PC; allocation processing unit; time of final state transition processing; final state transition processing PC; final state transition processing unit; and state. When a memory region is changed to a shared state, an event for setting the shared state occurs. Similarly, when the shared state is released, an event for the release occurs. Subsequently, in response to the release event, state data indicating that a shared memory region has occurred is deleted from the state table 104.

Therefore, the customizing unit CP writes a transition in the state of the memory region into the state table 104 in accordance with the occurrence of the event. In accordance with a state transition operation, the customizing CP reads the execution record table 103 from the head thereof, and when the transitioned state is dissolved, the state data is deleted from the state table 104. Therefore, the contents of the state table 104 or, in other words, state data changes so as to repeatedly occur and dissolve in association with the execution of the debugging target program P1.

Line 1 in FIG. 8 indicates that, for a memory region set to a shared state, data of the respective items described above is stored as a single piece of state data.

In other words, the state table 104 is updated in accordance with a state transition operation performed on a resource by a core processor, and when the transitioned state is dissolved, the state data is deleted from the state table 104.

In addition, as far as the example described above is concerned, the execution of an instruction in a program results in a bug when, for instance, data is written to a memory region that is in a shared state. A judgment criterion of an execution of such a violative instruction is stipulated in advance and stored in the storage unit 3 as table data.

(Protocol Rule Table)

FIG. 9 is a diagram showing an example of the table data (hereinafter referred to as a protocol rule table). A protocol rule table 105 is table data indicating, for each operation, whether the operation is a violation of a memory access protocol in accordance with a state of a memory region. The protocol rule table 105 shown in FIG. 9 includes, as judgment criteria data, for each instruction or each operation, whether valid or invalid (violation), a case where the memory region is in an exclusive state, and a case where the memory region is in a shared state.

Although the violation judgment criteria data is represented as data in a tabular format, the violation judgment criteria data need not necessarily be arranged in a tabular format.

In protocol violation judgment processing 12 shown in FIG. 4, when the customizing unit CP receives event information, a protocol violation judgment is performed based on data of the execution record table 103 and the state table 104 by referencing the protocol rule table 105.

When judged to be a violation, the customizing unit CP stores data on the protocol violation in a judgment result record table 106 shown in FIG. 10.

(Judgment Result Record Table)

FIG. 10 is a diagram showing an example of a judgment result record table. The judgment result record table 106 shown in FIG. 10 includes the respective items regarding a memory region when it is judged that there is a memory access protocol violation of: head of region; end of region; time of allocation (number of cycles); allocation PC; allocation processing unit; time of final state transition processing; final state transition processing PC; final state transition processing unit; state; time of violation transition processing; violation transition processing PC; and violation transition processing unit.

The customizing unit CP records in the judgment result record table 106, as a violation profile, data of the state table 104 as well as data on the time of violation transition processing, a violation transition processing PC, and a violation transition processing unit with respect to the time of occurrence of the violation. Therefore, even a repetitively occurring violation is comprehensively recorded into the judgment result record table 106. In other words, when an occurred event matches a predetermined condition, the customizing unit CP records information regarding the state of the main memory as a shared resource into the judgment result record table 106 as history information.

While the state table 104 shown in FIG. 8 is a table in which recorded data occurs and dissolves in accordance with state transitions, the judgment result record table 106 shown in FIG. 10 is a table to which the customizing unit CP, after judging whether or not the state prior to update and the state transition operation match conditions in the protocol rule table 105, adds data judged to be a violation.

EXAMPLE OF BUG DETECTION USING A PROGRAM EXAMPLE

Operations of the simulator P2 and the bug analysis displaying program P3 will now be described using a program example.

FIG. 11 is a diagram showing an example of a part of a program example containing a bug. A program 21 shown in FIG. 11 is a program containing an error (bug) which incorrectly writes a value to a given line in a memory region that is in a shared state.

Specifically, in the program 21, in line 3, the core 1 allocates a memory that is in a shared state. In line 4, the core 1 performs a read from the shared memory region. In line 5, the core 1 performs a write to the shared memory region. However, a write to a memory region that is in a shared state is incorrect. Therefore, the bug is detected by the simulator P2 as will be described later, and the content of the bug is outputted to the screen. In FIG. 11, it is assumed that "sw_on_core1( )" is to be executed on the core 1 and "sw_on_core2( )" is to be executed on the core 2.

In addition, the core 2 performs a read from the shared memory region in line 8, and a read from a shared memory region is correct.

Operations of the event monitoring unit, the event collecting unit EC, and the customizing unit CP with respect to the program 21 shown in FIG. 11 will now be described.

Due to the execution of a function "allocate_shared" in line 3, the core 1 allocates a memory in a shared state. Since the PC value of the function is registered in advance in an event monitoring unit that monitors a computation simulating unit that executes the function, the event monitoring unit is able to detect an execution of the function as an event. The event monitoring unit transmits information on the detected event to the event collecting unit EC. The event collecting unit EC notifies the received event information to the customizing unit CP.

Upon receiving the event information, the customizing unit CP gathers predetermined information of the computation simulating unit and the like via an internal state information gathering unit. Since the customizing unit CP is capable of acquiring information on a register and a memory corresponding to the computation simulating unit from the internal state information gathering unit, the customizing unit CP can obtain a value and a return value of an argument 1 (e.g., size) as predetermined information on the function "allocate_shared". In other words, the customizing unit CP is capable of detecting an event that changes the memory region to a shared state and record event information thereof into the execution record table 103.

The customizing unit CP judges whether a protocol violation has occurred or not based on event information recorded in the execution record table 103 by referencing the protocol rule table 105. However, in the case of the execution of the function in line 3, a protocol violation has not occurred.

In addition, in line 4 in the program 21, the core 1 performs a read from the shared memory region. The event monitoring unit conveys the read memory access to the event collecting unit EC as an event. The event collecting unit EC conveys the event to the customizing unit CP. The customizing unit CP stores the event information into the execution record table 103.

The customizing unit CP references the protocol rule table 105, and judges whether a protocol violation has occurred or not based on event information recorded in the execution record table 103. In the protocol rule table 105, it is stipulated that reading data from a memory region in a shared state does not constitute a protocol violation. Therefore, the customizing unit CP is able to reference history data of the event information in the execution record table 103 to confirm that the memory region to be read is in a shared state. In addition, since it is stipulated in the protocol rule table 105 that the read does not constitute a protocol violation, the customizing unit CP judges that the read from the shared memory region in line 4 is correct or, in other words, is not a protocol violation. Moreover, if necessary, the fact that a protocol violation has not occurred may be arranged so as to be outputted to a screen or the like.

In line 5, the core 1 performs a write to the shared memory region. Information on the write event is conveyed to the customizing unit CP according to a procedure similar to the procedure described above. The customizing unit CP judges whether or not the write memory access is correct or, in other words, whether or not the write memory access violates a predetermined condition by checking history data of event information in the execution record table 103. In this case, a write to a memory region that is in a shared state is incorrect. In the protocol rule table 105, it is stipulated that writing data to a memory region in a shared state constitutes a protocol violation. In other words, by referencing history data of event information in the execution record table 103, the customizing unit CP is able to judge that the memory region to be written to is in a shared state. Furthermore, since the customizing unit CP is able to determine that a write to a shared memory region is a protocol violation by referencing the protocol rule table 105, the customizing unit CP can judge that the write in line 5 is incorrect.

The customizing unit CP then stores data on the protocol violation into the judgment result record table 106, and outputs data to the effect that a violative access has occurred to a screen or the like. Methods of outputting and displaying data indicating that a violative access has occurred will be described later.

Furthermore, in line 8, the core 2 performs a read from the shared memory region. In the same manner as in line 5, event information is conveyed to the customizing unit CP. By referencing the protocol rule table 105, the customizing unit CP learns that a read from a shared memory region is connect and therefore does not judge the event to be a protocol violation, FIG. 12 is a diagram showing an example of a part of another program containing a bug. A program 22 shown in FIG. 12 is a program containing an error (bug) which incorrectly accesses a line in a memory that has been changed to an exclusive state by another core processor.

Specifically, in line 3 in the program 22, the core 1 allocates a memory region that is in an exclusive state. Since the PC value of the function is also registered in advance in the event monitoring unit, a call event of the function is detected by the event monitoring unit and information on the event is transmitted to the event collecting unit EC. The event collecting unit EC conveys the event information to the customizing unit CP.

In the same manner as in the case of the shared state described above, the customizing unit CP stores information on the memory region that has been changed to an exclusive state into the execution record table 103.

In line 4, the core 1 performs a read from the exclusive memory region. The read event is conveyed as event information to the customizing unit CP. The customizing unit CP references history data of the event information in the execution record table 103 as well as the protocol rule table 105 to judge whether the access (read) is correct or not.

In this case, since the read is performed by the core 1 which is the owner that changed the memory region to an exclusive state, the access is correct. If necessary, the fact that the access is correct can be arranged so as to be displayed on a screen or the like.

In addition, in line 5, the core 1 performs a write to the exclusive memory region. The write event is conveyed as event information to the customizing unit CP. Since the customizing unit CP judges that the write memory access by the core 1 that is the owner onto the memory region that is in an exclusive state is correct, an execution of an instruction in the next line is performed consecutively.

In line 8, the core 2 performs a read from the exclusive memory region. Information on the read event is conveyed to the customizing unit CP. According to the protocol rule table 105, it is stipulated that a read or write access to an exclusive region from a core processor other than the owner is a protocol violation. Therefore, the customizing unit CP can notify the user that the write in line 8 is a violative access or a protocol violation by displaying as such on a screen or the like. A method of notifying the user will be described later.

As described above, due to the protocol violation judgment processing 12 shown in FIG. 4, information regarding a violation event is accumulated in the judgment result record table 106 shown in FIG. 10. Specifically, an SW bug regarding cache consistency can be detected from the debugging target program P1. In addition, as described above, there is absolutely no need to change the debugging target program P1 itself when detecting the bug.

While the protocol rule used in the description above is a simple example that only involves a shared state and an exclusive state, protocol rule contents may become more complicated as long as events corresponding thereto can be monitored. Therefore, the present embodiment can be expanded to various protocol rules.

(Display Method to User)

As described above, according to the aforementioned simulator P2, information on an occurring bug in the debugging target program P1 that is a program under development is recorded into the execution record table 103, the state table 104, and the judgment result record table 106. In addition, according to the bug analysis displaying program P3, contents of the bug can be presented to the user in an easily-understood manner based on data recorded on the tables.

Hereinafter, display processing and display examples according to the bug analysis displaying program P3 which facilitate debugging will be described with reference to FIG. 4 and to FIGS. 13 to 17.

DISPLAY EXAMPLE 1

Display of Violation Line Number Table

FIG. 13 is a diagram showing a display example of a violation line number table as a first display example to be presented to the user. The table shown in FIG. 13 is to be displayed on the screen of the display unit 4.

When the user performs a predetermined instruction operation to the main body device 2 using an input device, not shown, the CPU 2a executes violation line number table search processing 13 (FIG. 4) and creates a violation line number table 201. The violation line number table 201 is generated based on data of the judgment result record table 106 and by further referencing the execution record table 103 and the state table 104.

The violation line number table 201 shown in FIG. 13 includes the respective items of: violation type; number of violations; violation transition processing source line; state; allocated source line; and final state transition processing source line.

A violation type indicates a content of a violation or, in other words, a type thereof, and is extracted from the contents of the protocol rule table 105.

The number of violations is calculated from history data of event information in the execution record table 103 by counting the number of violation occurrences.

A violation transition processing source line is a line of a source code which caused the violation occurrence and is extracted from debug information of a PC value corresponding to the line of the source code.

A state represents a state at the time of the violation occurrence and is generated from the state table 104.

An allocated source line represents a line of a source code to which a violative memory region has been allocated, and is extracted from debug information of the allocated PC value in the state table 104. An allocated source line is, for example, a source line to which the memory region has been allocated. In FIG. 13, the allocated source line is shown to be line 20 of "test 1.c".

A final state transition processing source line represents a line of a source line to which the state of a memory region involved in the violation last transitioned in a normal manner, and is extracted from debug information of a final state transition processing PC value in the state table 104.

When the user issues an instruction to the main body device 2 for executing violation line number table render processing 14 in which data of the violation line number table 201 is displayed on the screen of the display unit 4, the violation line number table render processing 14 is executed and the table shown in FIG. 13 is displayed on the screen.

In other words, the user is now able to understand, at a glance, a line of the source code which has caused the allocation of the region (allocated source line) and a line of the source code which has caused the state to be set (final state transition processing source line) together with a line of the source code in which the violation has occurred (violation transition processing source line).

Therefore, when the execution of the simulator P2 is concluded, by instructing a predetermined display command to the CPU 2a and having the CPU 2a execute violation line number table search processing 13 and violation line number table render processing 14, the user can have data in the violation line number table 201 displayed on the screen of the display unit 4 in a tabular format image shown in FIG. 13, and perform debugging in an easy manner. Moreover, while the embodiment described above is arranged such that displaying to the user is performed after the simulator P2 comes to a complete stop, the embodiment described above may be alternatively arranged so that displaying such as described above is performed when the simulator P2 is suspended by a debugging instruction or the like on events up to that point.

DISPLAY EXAMPLE 2

Source Code Highlighting Display

Figure 14:
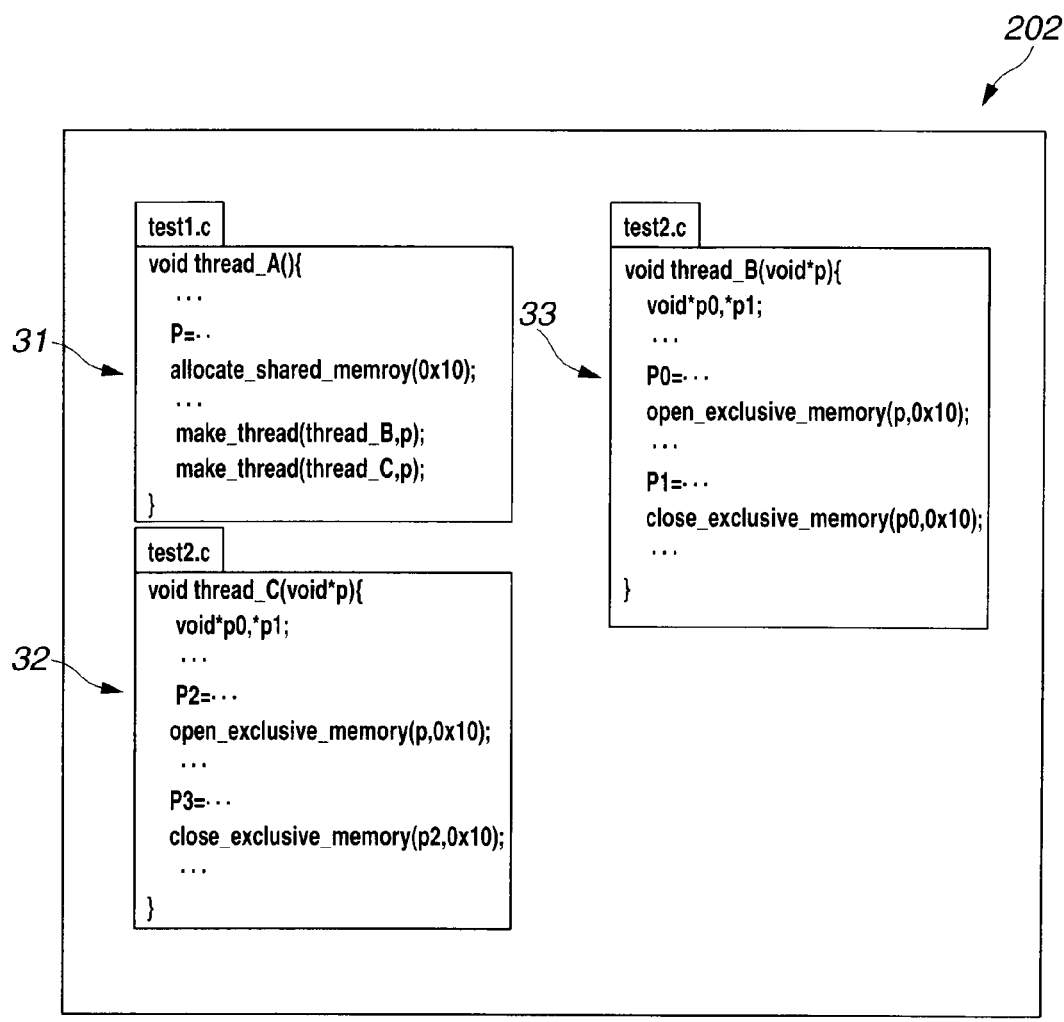
FIG. 14 is a diagram showing an example of a source code highlight display according to the first embodiment of the present invention.

FIG. 14 is a diagram showing an example of source code highlighting display.

Once data of the violation line number table 201 is generated, a source code of a violative line can be displayed in highlight based on the data of the violation line number table 201.

When the user performs a predetermined instruction operation to the main body device 2 using an input device, not shown, the CPU 2a executes source code information extraction processing 15 and source code render processing 16, and generates data for a source code highlighting display screen 202 shown in FIG. 14. The source code highlighting display screen 202 is generated based on data of the violation line number table 201 by further using processing results of the source code information extraction processing 15.

In source code render processing 16, data of a part of a corresponding source code in the debugging target program P1 among data of a violation transition processing source line, an allocated source line, and a final state transition processing source line shown in FIG. 13 is read from the storage unit 3.

In source code information extraction processing 15, information of a source code rendered by the source code render processing 16 is extracted from the judgment result record table 106 and the debugging target program P1, and supplied to the source code render processing 16. Specifically, based on a PC value of a function included in debug information and on source line number correspondence information, information on the source code is acquired.

The source code render processing 16 generates display screen data in a predetermined placement relationship shown in FIG. 14, and outputs the display screen data to the display unit 4. Three display regions 31, 32, and 33 are displayed in a predetermined placement relationship on the screen of the display unit 4. The source code render processing 16 and the source code information extraction processing 15 constitute a source code display processing unit that displays, based on history information, a source code related to a data access determined to be a violation.

In FIG. 14, a plurality of source lines including the allocated source line is displayed in the display region 31, a plurality of source lines including the violation transition processing source line is displayed in the display region 32, and a plurality of source lines including the final state transition processing source line is displayed in the display region 33.

Therefore, since a source code portion including a source code in which a bug occurred is displayed together with relevant source code portions related to the start and the end of a state, the user is able to directly view the source code. As a result, debugging is facilitated.

DISPLAY EXAMPLE 3

Violation Time List Display

Furthermore, an example in which temporal data related to a violation is additionally displayed will be described.

FIG. 15 is a diagram showing an example of a violation time list display. The table shown in FIG. 15 is to be displayed on the screen of the display unit 4.

When the user performs a predetermined instruction operation to the main body device 2 using an input device, not shown, the CPU 2a executes violation time list render processing 17 and creates a violation time list. A violation time list 203 is generated based on data of the judgment result record table 106.

The violation time list 203 shown in FIG. 15 includes the respective items of: time of violation transition processing; head of region; end of violation; state; time of allocation; and time of final state transition processing, and is extracted from the contents of the judgment result record table 106.

A time of violation transition processing represents a time of occurrence of a violation.

A head of region is an address of a head of a memory region related to the violation.

A state represents a state at the time of occurrence of the violation.

A time of allocation represents the time where the memory region related to the violation was allocated.

A time of final state transition processing represents the time where the state of the memory region related to the violation has last made a transition in a normal manner.

When the user issues an instruction to the main body device 2 for executing violation time list render processing 17 in which data of the violation time list 203 is displayed on the screen of the display unit 4, the violation time list render processing 17 is executed and the table shown in FIG. 15 is displayed on the screen.

In other words, the user is able to understand, at a glance, the time of the cause of the allocation of the region (time of allocation) and the time where the state ends (time of final state transition processing) together with the time of the occurrence of the violation (time of violation transition processing).

Therefore, upon conclusion of the execution of the simulator P2, when the user instructs a predetermined display command to the CPU 2a, the CPU 2a executes violation time list render processing 17. As a result, data of the violation time list 203 can be displayed on the screen of the display unit 4 in a tabular format image shown in FIG. 15, thereby enabling debugging to be performed in an easy manner.

DISPLAY EXAMPLE 4

Time-Sequence Diagram

Figure 16:
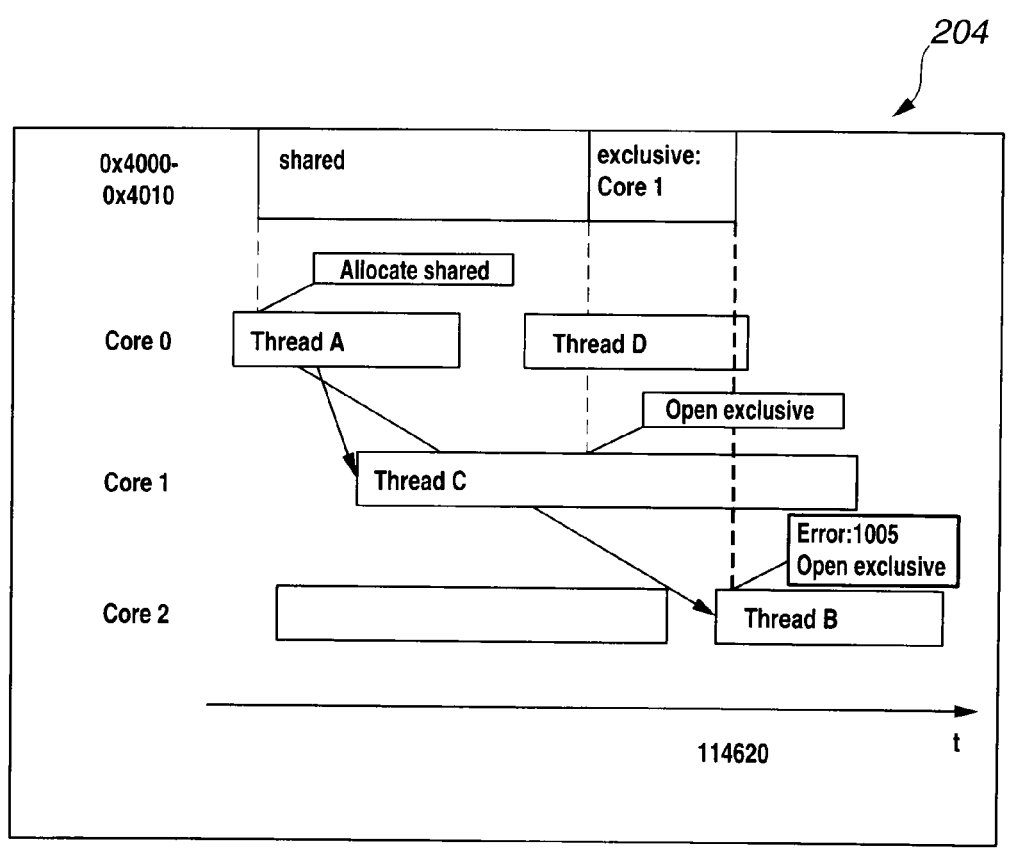
FIG. 16 is a diagram showing an example of a time-sequence display of a function when a violation is detected according to the first embodiment of the present invention.

FIG. 16 is a diagram showing an example of a time-sequence display of a function when a violation is detected.

Once data of the violation time list 203 is generated, a time-sequence display of a function related to the violation can be performed based on the data of the violation time list 203.

When the user performs a predetermined instruction operation to the main body device 2 using an input device, not shown, the CPU 2a executes time-sequence diagram extraction processing 18, and generates data for a time-sequence display screen 204 of a function related to the violation. The time-sequence display screen 204 is generated based on data of the judgment result record table 106.

The time-sequence diagram extraction processing 18 extracts temporal data of each function related to the violation from the violation time list 203 and the judgment result record table 106, generates display screen data in a predetermined placement relationship shown in FIG. 16, and outputs the display screen data to the display unit 4. The violation time list render processing 17 and the time-sequence diagram render processing 18 constitute a time-sequence display unit that displays, based on history information, an execution state of a function related to a data access considered to be a violation in a time-sequence.

The example shown in FIG. 16 is an example in which three core processors and execution states of respective functions are displayed in a time sequence on the screen of the display unit 4. In the time-sequence display shown in FIG. 16, the abscissa represents time (number of cycles) while the ordinate corresponds to each core, and an execution state per parallel execution (in this case, an execution state of a function that is executed by each core) is displayed in a time sequence.

Furthermore, a value of a related memory region and a state thereof are shown in a part of the screen which, in this case, is an upper area of the screen. Moreover, in FIG. 16, a popup window is used to display which function caused a state transition, whereby a violative code is also displayed in the popup window in association with the function that caused the violation.

FIG. 16 shows a case where: a given memory region is allocated in a shared state (allocate shared); the memory region is then changed to an exclusive state by the core 1 (open exclusive); and, subsequently, the core 2 further attempts to change the memory region to the exclusive state (open exclusive). The second open exclusive is a protocol violation. Therefore, since each core, each function, and the state of the memory region related to the violative state are displayed in accordance with the passage of time, the user is able to perform debugging on the bug portion in an easy manner.

Moreover, as a modification, a search may be performed so as to determine whether or not a line in which a violation occurred had been previously executed without causing a violation, and a time-sequence diagram similar to FIG. 16 may be arranged to be displayed.

Figure 17:
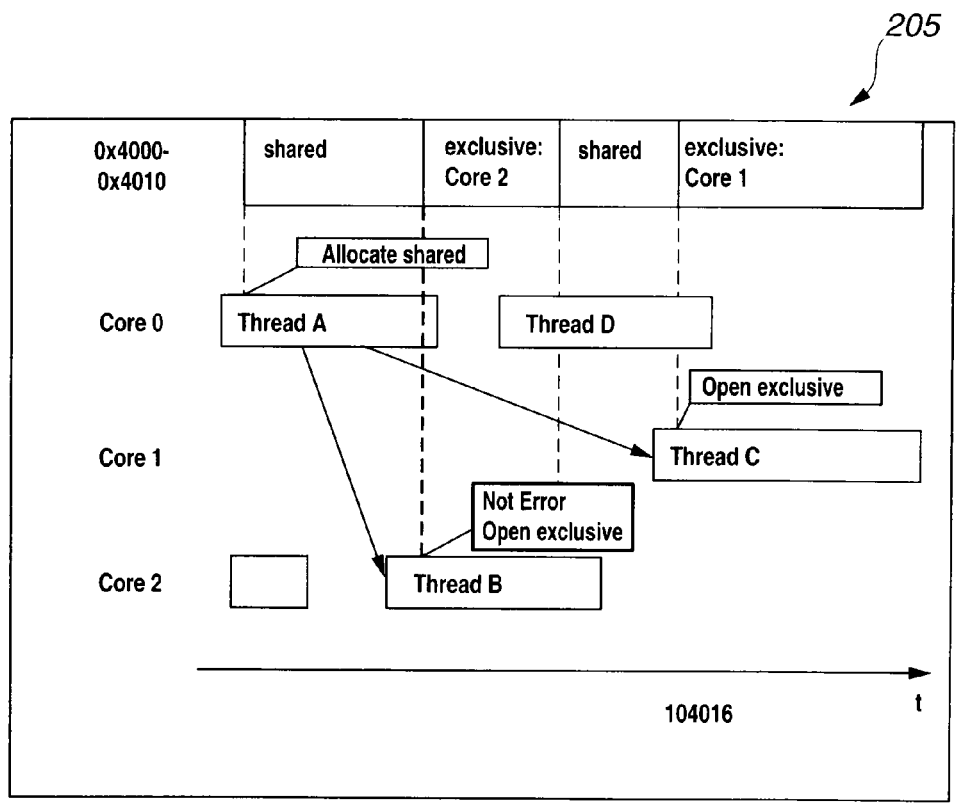
FIG. 17 is a diagram showing, in correspondence with FIG. 16, an example of a time-sequence display of a case where the line that created a violation had been previously executed without creating the violation, according to the first embodiment of the present invention.

FIG. 17 is a diagram showing, in correspondence with FIG. 16, an example of a time-sequence display of a case where a line that caused a violation had been previously executed without causing a violation.

When the user performs a predetermined instruction operation to the main body device 2 using an input device, not shown, the CPU 2a executes similar location search processing 19 to extract and generate, by searching the judgment result record table 106, data of a time-sequence display screen 205 shown in FIG. 16 of a previous execution of the violation-related function when the violation had not occurred. The similar location search processing 19 constitutes a search processing unit that searches, from history information, data on an execution state of a previous execution that did not cause a violation of a function related to a data access considered to be a violation.

Based on temporal data generated by the similar location search processing 19 of a previous execution that did not cause a violation of each violation-related function, the time-sequence diagram render processing 18 generates display screen data in a predetermined placement relationship shown in FIG. 17, and outputs the display screen data to the display unit 4.

In FIG. 17, in the same placement relationship as FIG. 16, a popup window displays what function has caused what kind of state transition. At the same time, the fact that a function that had previously caused a violation did not cause a violation is also displayed in the popup window.

In FIG. 17, a code of a function B of the core 2 which caused a violation in FIG. 16 is shown so as not to be causing a violation.

Therefore, by generating and displaying both FIG. 16 and FIG. 17, the user can display, in accordance with the passage of time, both a situation where a violation-causing function has caused a violation and a situation where the violation-causing function has not caused a violation, and compare the two situations. Consequently, it becomes easier to investigate the cause of a protocol violation upon an occurrence thereof.

As described above, according to the present invention, bug-related information can be detected accurately in a system where cache consistency is maintained by means of SW.

In addition, by displaying and presenting such information related to a detected bug to a user in an easy-to-understand manner, cause analysis of the bug can be facilitated.

(Second Embodiment)

While the first embodiment concerns a bug detecting system in a system that maintains cache consistency by means of SW, a second embodiment concerns a system for detecting information related to exclusive control of a main memory.

In other words, in the present embodiment, a PC value of a code that performs lock and unlock for exclusive control is registered as an event in the event monitoring unit, and information on conditions for verifying the exclusive control is registered in the protocol rule table.

Therefore, while a software configuration of the simulator P2 according to the present embodiment is the same as the configuration of the first embodiment shown in FIG. 2, the present embodiment differs from the first embodiment in that a synchronized state in exclusive control is detected instead of a bug in a system that maintains cache consistency by means of SW.

A program to be executed by a multi-core processor system requires exclusive control processing. Therefore, normally, exclusive control is realized using a tas (test-and-set) instruction or an equivalent indivisible instruction.

Figures 18, 19:
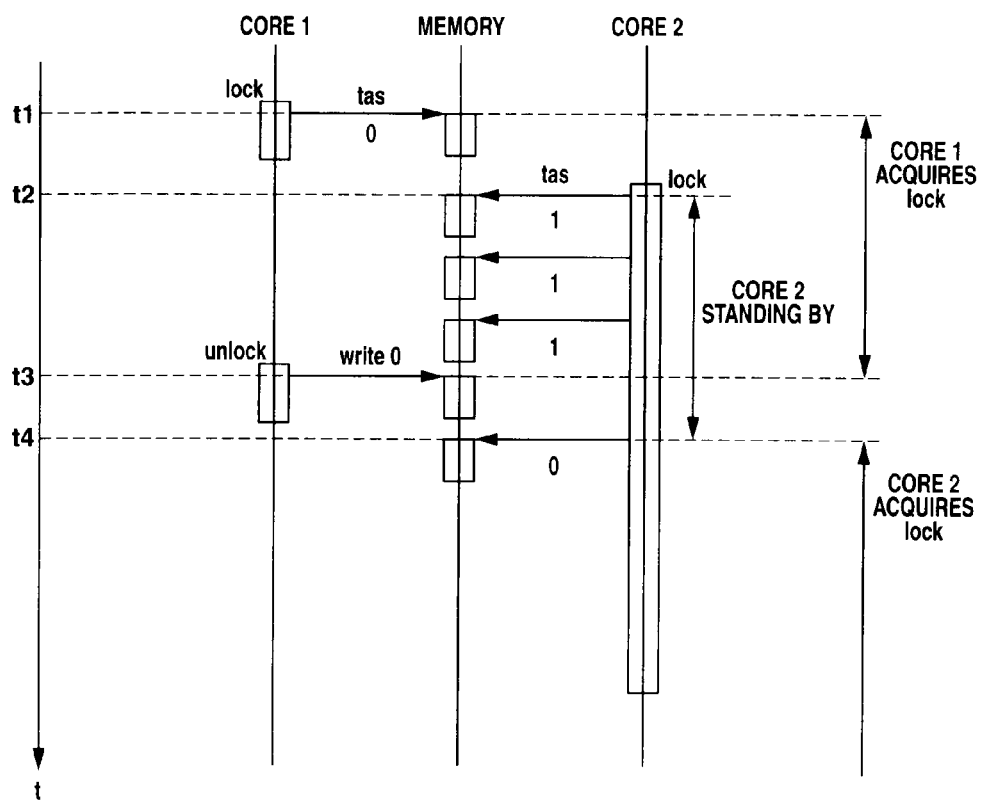
FIG. 18 is a diagram showing an implementation example of exclusive control processing using a tas instruction according to a second embodiment of the present invention.
FIG. 19 is a diagram showing an example of a time-sequence display of a case where exclusive control is executed according to the second embodiment of the present invention.

FIG. 18 is a diagram showing an implementation example of exclusive control processing using a tas instruction. A core processor attempting to occupy a memory checks whether or not a tas(adr) value is 1. If the value is 1, since the memory is occupied by another core processor, the core processor enters a wait state and checks the tas(adr) value at a predetermined time interval. If the value is 0, the core processor can occupy the memory.

FIG. 19 is a diagram showing an example of a time-sequence display when exclusive control is executed. In FIG. 19, the ordinate represents a temporal axis while the abscissa represents each core and memory. FIG. 20 is a diagram showing an example of a lock/unlock management table.

A case where the debugging target program P1 runs using a lock and unlock program shown in FIG. 18 will now be described. It is assumed that a tas instruction is to be issued to address c.

When the core 1 performs a lock for exclusive control, the execution of the lock function is detected as an event by the event monitoring unit. It is assumed that a PC value of the lock function is set in advance by the event monitoring unit.

The event monitoring unit notifies the event to the event collecting unit EC. In turn, the event collecting unit EC notifies the event to the customizing unit CP.

Upon being notified that a lock operation is started, the customizing unit CP checks a target address of the tas instruction via the internal state information gathering unit. In addition, the customizing unit CP starts monitoring the bus simulating unit CB with respect to the address.

At time t1, the customizing unit CP is notified through the event collecting unit EC that a bus access due to the tas instruction has occurred. In addition, the customizing unit CP detects that the core 1 has acquired a lock from the result of the bus access, and records the detected information as a profile related to the exclusive control to a lock/unlock management table 206 shown in FIG. 20.

In a similar manner, a lock function of the core 2 is detected and the customizing unit CP monitors bus access by the core 2. The customizing unit CP detects that, due to the fact that the core 1 has already acquired a lock, the core 2 is unable to acquire a lock or, in other words, a lock acquisition by the core 2 has failed, and records the lock acquisition failure as a profile related to the exclusive control in the lock/unlock management table 206.

Although the core 2 subsequently continues to execute a lock function, lock acquisition fails.

At time t3, the customizing unit CP detects that an unlock function is called and records the same. At time t4, the customizing unit CP detects that the core 2 has acquired a lock because 0 is read by the tas instruction, and records the lock acquisition in the lock/unlock management table 206.

In the example shown in FIG. 19, the core 1 has acquired a lock from t1 to t3, and the core 2 must wait from t2 to t3. The wait time is an overhead and the shorter, the better.

The program development apparatus 1 is able to display the lock/unlock management table 206 shown in FIG. 20 without modification onto the screen of the display unit 4. By studying the lock/unlock management table 206 display on the screen, the user finds that the core 2 had failed three times to acquire a lock. In addition, the user also learns the wait time (t2 to t4) of core 2.

In addition, a time-sequence diagram shown in FIG. 19 may be arranged to be displayed on the screen. By studying FIG. 19, the user can visually confirm that the core 2 has repeatedly attempted, and failed, to perform a lock. From FIG. 19, the user is able to understand at a glance that the core 2 was finally able to acquire a lock after several lock attempts and that the performance of the program can be improved by creating the program so that such attempts can be eliminated or at least reduced.

A processing unit related to exclusive control which corresponds to the violation line number table render processing 14 and the time-sequence diagram extraction processing 19 constitutes a lock success/failure display processing unit that displays information on the success or failure of a lock acquisition obtained based on history information by executing a function related to exclusive control.

By studying the lock/unlock management table 206 shown in FIG. 20 or the time-sequence diagram shown in FIG. 19, even when unlock is forgotten due to a SW bug, the user can identify which core is the cause in an easier manner. In addition, while a deadlock occurs when a plurality of locks is acquired in a different order due to a SW bug, the user can understand such a situation and identify a lock function related to the deadlock.

As described above, with a program development apparatus according to the present embodiment, a synchronized state in exclusive control can be detected and, furthermore, a state of the synchronization acquisition can be displayed and notified to the user in an easy-to-understand manner.

In the present embodiment as well, a related source code or the like may also be arranged to be displayed in the same manner as the first embodiment by adding a PC value of a lock instruction or the like to information to be registered in the lock/unlock management table 206. With respect to the source code display, a processing unit corresponding to the source code render processing 15 shown in FIG. 4 and to source code information extraction processing constitutes a source code display processing unit regarding exclusive control.

As described above, with the debugging support device according to the two embodiments described above, in a multi-core processor system, information related to a bug or the like of a program to be executed in parallel can be detected accurately.

In addition, with the debugging support device described above, information related to a bug or the like can be presented to a program developer or the like in an easily-understood manner.

While a description has been given on a memory access protocol violation and debugging during exclusive control in a system where cache consistency is maintained by means of SW, the configurations of the simulator and the bug analysis displaying program described above can also be applied to other various purposes.

In addition, it is to be understood that the respective "units" described in the present specification are merely conceptual entities corresponding to the respective functions of the embodiments, and do not necessary correspond one-to-one to specific hardware or software routines. Therefore, in the present specification, embodiments have been described by assuming virtual circuit blocks (units) having the respective functions of the embodiments. Furthermore, in regard to the respective steps forming the respective procedures in the embodiments described above, the execution sequence of the steps may be changed, a plurality of steps may be executed concurrently, or the steps may be executed in a different sequence for each execution as long as the properties of the procedures are not contradicted.

A program that executes the operations described above is entirely or partially recorded or stored as a computer program product in a portable medium such as a flexible disk or a CD-ROM, or in a storage medium such as a hard disk. All of or a part of the operations are executed when the program is read by a computer. Alternatively, all of or a part of the program may be distributed or provided via a communication network. By downloading the program via a communication network and installing the program into a computer, or by installing the program from a storage medium into the computer, the user is able to realize the debugging support device according to the present invention in a readily manner.

The present invention is not limited to the embodiments described above, and various changes and modifications can be made to the invention without departing from the spirit and scope thereof.

What is claimed is:

1. A debugging support device comprising:
   a plurality of CPU simulating units which simulates the operations of a plurality of CPUs which executes programs in parallel;
   a shared resource simulating unit which simulates a shared resource to be shared by the plurality of CPUs;
   an event monitoring unit that detects a predetermined event occurring between each CPU simulating unit and the shared resource simulating unit;
   a state judging unit that judges whether the state of the occurred predetermined event matches a predetermined condition and, if the predetermined condition is matched, records history information related to the state of the shared resource, wherein the predetermined condition is a condition under which data access to the shared resource is considered a violation;
   a time sequence display unit that displays, based on the history information, an execution state of a function related to the data access that was considered to be a violation in a time sequence; and
   a search processing unit that searches, from the history information, data of an execution state of a function related to the data access considered to be a violation when the function was executed without causing the violation, wherein
   the time sequence display unit displays, in a time sequence, the execution state when the function was executed without causing the violation which was searched and acquired by the search processing unit.

2. The debugging support device according to claim 1, wherein the predetermined condition is settable and changeable.

3. The debugging support device according to claim 1, wherein
the data access is an access via a cache memory simulating unit provided in each CPU simulating unit, and
the condition under which the data access is considered a violation is a condition for safeguarding the coherence of the cache memory.

4. The debugging support device according to claim 1, wherein
the predetermined condition is a condition for verifying exclusive control with respect to the shared resource.

5. The debugging support device according to claim 4, wherein
the exclusive control is realized using a test-and-set instruction or an indivisible instruction equivalent to the test-and-set instruction, and
the exclusive control is verified by monitoring a success/failure of an execution of a function of the test-and-set instruction or the indivisible instruction.

6. The debugging support device according to claim 1, further comprising
a source code display processing unit that displays, based on the history information, a source code related to the data access that was considered to be a violation.

7. The debugging support device according to claim 6, wherein
the display of the source code related to the data access that was considered to be a violation is a display including a portion of the source code of a violation transition, a portion of the source code to which a state considered to be the violation was allocated, and a final portion of the source code in which the state continues.

8. The debugging support device according to claim 4, further comprising
a lock success/failure display processing unit that displays, based on the history information, information related to the success or failure of a lock obtained by an execution of a function related to the exclusive control.

9. The debugging support device according to claim 8, further comprising
a source code display processing unit that displays a portion of a source code that executes a function related to the exclusive control.

10. The debugging support device according to claim 4, further comprising
a time sequence display unit that displays, in a time sequence, an execution state of a function related to the exclusion control.

11. A debugging support method which uses a debugging support device comprising a plurality of CPU simulating units which simulates the operations of a plurality of CPUs which executes programs in parallel and a shared resource simulating unit which simulates a shared resource to be shared by the plurality of CPUs to:
detect a predetermined event occurring between each CPU simulating unit and the shared resource simulating unit;
judge whether the state of the occurred predetermined event matches a predetermined condition,
if the predetermined condition is matched, records history information related to the state of the shared resource,
wherein the predetermined condition is a condition under which data access to the shared resource is considered a violation;
display, based on the history information, an execution state of a function related to the data access that was considered to be a violation in a time sequence;
search, from the history information, data of an execution state of a function related to the data access considered to be a violation when the function was executed without causing the violation; and
said display comprising display, in a time sequence, the execution state when the function was executed without causing the violation which was searched and acquired.

12. The debugging support method according to claim 11, wherein
the predetermined condition is settable and changeable.

13. The debugging support method according to claim 11, wherein
the data access is an access via a cache memory simulating unit provided in each CPU simulating unit, and
the condition under which the data access is considered a violation is a condition for safeguarding the coherence of the cache memory.

14. The debugging support method according to claim 11, wherein
the predetermined condition is a condition for verifying exclusive control with respect to the shared resource.

15. The debugging support method according to claim 14, wherein
the exclusive control is realized using a test-and-set instruction or an indivisible instruction equivalent to the test-and-set instruction and
the exclusive control is verified by monitoring a success/failure of an execution of a function of the test-and-set instruction or the indivisible instruction.

16. A non-transitory computer-readable storage medium including a program, the program causing a computer to execute:
detecting a predetermined event occurring between each of a plurality of CPU simulating units which simulates the operations of a plurality of CPUs which executes programs in parallel and a shared resource simulating unit which simulates a shared resource to be shared by the plurality of CPUs;
judging whether the state of the occurred predetermined event matches a predetermined condition;
recording, if the predetermined condition is matched, history information related to the state of the shared resource, wherein the predetermined condition is a condition under which data access to the shared resource is considered a violation;
time sequence display, based on the history information, of an execution state of a function related to the data access that was considered to be a violation in a time sequence; and
search processing that searches, from the history information, data of an execution state of a function related to the data access considered to be a violation when the function was executed without causing the violation, wherein
the time sequence display comprises display, in a time sequence, of the execution state when the function was executed without causing the violation which was searched and acquired.

* * * * *